United States Patent
Baweja et al.

(10) Patent No.: US 7,143,128 B1
(45) Date of Patent: Nov. 28, 2006

(54) INTERACTIVE DATA PROCESSOR CONTROLLED DISPLAY INTERFACE FOR TRACKING OF ALLOCATED MESSAGES IN A DYNAMIC WORKLOAD BALANCING COMMUNICATION SYSTEM

(75) Inventors: Baljeet Singh Baweja, Austin, TX (US); Kulvir Singh Bhogal, Austin, TX (US); Nizamudeen Ishmael, Jr., Austin, TX (US); Mandeep Singh Sidhu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1265 days.

(21) Appl. No.: 09/589,799

(22) Filed: Jun. 8, 2000

(51) Int. Cl.
*G06F 15/16* (2006.01)
*G06F 9/00* (2006.01)
(52) U.S. Cl. .................. 709/201; 345/530; 718/105
(58) Field of Classification Search ............... 345/326, 345/530; 395/500, 609, 675; 370/17; 709/105, 709/104, 200–203, 217–228; 718/100–105; 719/310–318
See application file for complete search history.

(56) References Cited

U.S. PATENT DOCUMENTS

| | | | |
|---|---|---|---|
| 5,495,607 A | | 2/1996 | Pisello et al. .................. 707/10 |
| 5,537,550 A | * | 7/1996 | Russell et al. ............... 709/224 |
| 5,568,471 A | | 10/1996 | Hershey et al. .............. 370/245 |
| 5,799,173 A | * | 8/1998 | Gossler et al. .................. 703/21 |
| 5,825,769 A | * | 10/1998 | O'Reilly et al. ............. 370/360 |
| 5,867,706 A | * | 2/1999 | Martin et al. ................ 718/105 |
| 5,884,077 A | * | 3/1999 | Suzuki ........................ 709/105 |
| 5,938,722 A | * | 8/1999 | Johnson ....................... 709/105 |
| 5,958,012 A | | 9/1999 | Battat et al. ................. 709/224 |
| 6,038,601 A | * | 3/2000 | Lambert et al. ............. 709/226 |
| 6,185,601 B1 | * | 2/2001 | Wolff ........................... 709/203 |
| 6,223,205 B1 | * | 4/2001 | Harchol-Balter et al. ... 718/105 |
| 6,279,001 B1 | * | 8/2001 | DeBettencourt et al. ....... 707/10 |
| 6,317,786 B1 | * | 11/2001 | Yamane et al. .............. 709/224 |
| 6,438,652 B1 | * | 8/2002 | Jordan et al. ................ 711/120 |
| 6,442,165 B1 | * | 8/2002 | Sitaraman et al. ........ 370/395.4 |
| 6,560,630 B1 | * | 5/2003 | Vepa et al. .................. 709/105 |
| 6,578,159 B1 | * | 6/2003 | Kitagawa et al. .............. 714/15 |
| 6,629,148 B1 | * | 9/2003 | Ahmed et al. ............... 709/238 |
| 6,633,898 B1 | * | 10/2003 | Seguchi et al. .............. 709/201 |
| 6,658,449 B1 | * | 12/2003 | Brenner et al. .............. 718/105 |

OTHER PUBLICATIONS

Wolff, "Dynamic Laod balancing of a network of client and server computer", U.S. Publication 2003/0126200 A1, Jul. 3, 2003.*

(Continued)

*Primary Examiner*—John Follansbee
*Assistant Examiner*—Haresh Patel
(74) *Attorney, Agent, or Firm*—Jerry B. Kraft; Jeffrey S. LaBaw (57) ABSTRACT

Tracking and displaying of allocated messages in dynamic workload balancing systems in message driven transaction environments which involve distributing data processing transactions into messages and dynamically allocating each of the messages to different computer systems for performance, comprising enabling a user to request the performance of a data processing transaction, dynamically transforming via a server computer any requested transactions into messages free of user input and then allocating the messages to different computer systems. The system has user interactive displays for displaying the allocated messages and associated computer systems when required by the user so that he may track the messages.

14 Claims, 8 Drawing Sheets

OTHER PUBLICATIONS

Johnson et al. "Systems and methods for the deterministic management of information", U.S. 2002/0133593 A1, Sep. 19, 2002.*

High Performance Computing Systems and Applications (Conference), 12th, Calgary, May 20-22, 1998 (proceedings of HPCS'98) pp. 193-206, M. Brune et al.

Laod-balancing Algorithm on Distributed Systems with Broadcast Facility, Denshi Joho Tsushin Gakkai Ronbunshi, D-1, N. Yamai et al. vol. 75, issue 8, Aug. 1992, pp. 536-544.

Distributed Job Management: NetShepherd, NEC GIO, Naka, S. Et al., vol. 8, Issue 2, Mar. 1995, pp. 95-99.

* cited by examiner

FIG. 2

SERVER QUEUE - PRIMARY -

| ID | SUBJECT | SENDER | TIME SENT | DELEGATED | STATUS |
|---|---|---|---|---|---|
| 1. ⊞ First Queue Item | Workload Balancing Server | 3:32PM-11/10/99 | Bob's Computer | Received |
| 2. ⊞ Second Queue Item | Workload Balancing Server | 3:43PM-11/10/99 | Greg's Computer | Received |
| 3. ⊞ Third Queue Item | Workload Balancing Server | 3:44PM-11/10/99 | Bob's Computer | Received |
| 4. ⊞ Fourth Queue Item | Workload Balancing Server | 3:45PM-11/10/99 | Angela's Machine | Removed |
| 5. ⊞ Fifth Queue Item | Workload Balancing Server | 3:47PM-11/10/99 | Greg's Laptop | Received |
| 6. ⊞ Sixth Queue Item | Workload Balancing Server | 3:52PM-11/10/99 | Anthony's Box | Not Received |
| 7. ⊞ Seventh Queue Item | Workload Balancing Server | 4:02PM-11/10/99 | Greg's Computer | Received |
| 8. ⊞ Eighth Queue Item | Workload Balancing Server | 4:03PM-11/10/99 | Tom's Server | Queuing |

Clicking "Plus" by a specific queue item to view a detailed tracking

FIG. 3

SERVER QUEUE - PRIMARY -

| ID | SUBJECT | SENDER | TIME SENT | DELEGATED TO | STATUS |
|---|---|---|---|---|---|
| 1. ⊞ | First Queue Item | Workload Balancing Server | 3:32PM-11/10/99 | Bob's Computer | Received |
| 2. ⊞ | Second Queue Item | Workload Balancing Server | 3:43PM-11/10/99 | Greg's Computer | Received |
| 3. ⊞ | Third Queue Item | Workload Balancing Server | 3:44PM-11/10/99 | Bob's Computer | Received |
| 4. ⊞ | Fourth Queue Item | Workload Balancing Server | 3:45PM-11/10/99 | Angela's Machine | Removed |
| 5. ⊞ | Fifth Queue Item | Workload Balancing Server | ...0/99 | Greg's Laptop | Received |
| 6. ⊞ | Sixth Queue Item | Workload Balancing Se... | ...0/99 | Anthony's Box | Not Received |
| 7. ⊞ | Seventh Queue Item | Workload Balancing Se... | ...[TRACK ALLOCATION] | Greg's Computer | Received |
| 8. ⊞ | Eighth Queue Item | Workload Balancing Server | 4:03PM-11/10/99 | Tom's Server | Queuing |

Clicking "Plus" by a specific queue item to view a detailed tracking

FIG. 4

TRACK ALLOCATION

Queue Item History: Sixth Message, ID #6

Sent By Workload Balancing Server at 3:52 PM - 11/10/99
Delegated to Bob's Computer at 3:56 PM - 11/10/99
Delegated to Angela's Machine at 3:58 PM - 11/10/99
Delegated to Anthony's Box at 4:01 PM - 11/10/99

Queue Item Current Status: NOT RECEIVED

FIG. 8

INTERACTIVE DATA PROCESSOR CONTROLLED DISPLAY INTERFACE FOR TRACKING OF ALLOCATED MESSAGES IN A DYNAMIC WORKLOAD BALANCING COMMUNICATION SYSTEM

TECHNICAL FIELD

The present invention relates to dynamic workload balancing and distribution in message driven transaction environments, and particularly to the tracking of dynamically allocated messages through a display interface.

BACKGROUND OF RELATED ART

Distributed data processing is a form of information processing in which workload is performed by separate computers linked through a communication network. One form of distributed data processing which is currently widely used is dynamic workload balancing in a message driven transaction environment. Such message driven environments are described in U.S. Pat. No. 5,799,173, filed on May 21, 1997, and in the text, *Production Workflow, Concepts and Techniques,* Frank Leymann et al., published 2000, Prentice Hall, New Jersey, particularly at pp. 319–338. In a message driven transaction environment, communication between the user who initiates the transaction on a client computer and the computer systems to which portions of the transaction are dynamically distributed for performance or execution is based upon messages put into sequences of queues. A message may be considered to be a service request or a reply distributed and allocated via a server computer.

In a typical dynamic workload balancing system or process, a user on a client computer initiates a data transaction or sequence of transactions. The initiation data is sent to a server computer or a set of server computers that will create the transactions, and which are linked to other computer systems which in turn may be individual computers or servers respectively connected to other sets of computers. A data transaction for purposes of the present description is defined as a discrete activity performed by a computer system. A transaction may be as simple as the entry of a customer order or the update of an inventory item. It may be as complex as a substantial portion of a computer program or routine. In message driven transaction environments, as in the present invention, the transactions are distributed or divided into messages which are allocated through queues and sequences of queues to linked computers or computer systems for message execution or performance. The International Business Machines Corporation (IBM) MQSeries™ application programs, e.g. the MQSeries for WindowsNT™, is described in the above Leymann et al. text at pp. 320–338. The primary advantage of workload balancing systems such as the MQSeries is that the system can operate to distribute and balance workload on computer systems operating on multiple platforms, e.g. in the case of the MQSeries, up to 35 different platforms. The workload is allocated via message queues so that the whole balancing and allocation is transparent to the initiating user and his input workload appears to be operating as if it were being done on an individual computer. All of the networking protocols in the distribution and message allocation needed to complete user input transaction requests are invisible to the user.

The advantage to the user is that the user need not be concerned with all of the networking protocols, nodes and channels which must be traversed in the workload distribution, since this is seamlessly, automatically and dynamically done by the workload balancing algorithm. This leaves the operator/user free to concentrate on the business and production problems involved in the work. While this advantage is certainly considerable, we have found that transparentness of the workload balancing operation do provide problems to workload balancing system administrators in the case where messages are delayed or even lost in distribution and allocation. In current workload balancing systems, there is no user friendly process for tracking lost or delayed messages. In current workload balancing systems, it is necessary for system administrators to go to each queue manager's queue on any computer system that could have possibly received a message from the workload messages. Even then, if the administrator is trying to track an individual message's route, the task is made particularly difficult if the message has for some reason been removed from the message queue at any particular point.

In this connection, if we conceive a workload distribution network with a hierarchy of several levels of computer systems with appropriate servers having queue manager's queues, and, in some cases, even intermediate Internet channels or connections, the difficulty of tracking becomes even more apparent.

SUMMARY OF THE PRESENT INVENTION

The present invention basically relates to a system, method and program for monitoring workload balancing in distributing data processing transactions into messages and dynamically allocating each of the messages to different computer systems for performance. This comprises enabling a user to request the performance of a data processing transaction and then, without any user input, dynamically transforming via a server computer any requested transactions into messages. These messages are then allocated to different computer systems. The system has user interactive display means for displaying the allocated messages and computer systems when required by the user so that he may track the messages.

More particularly, the invention involves systems in which some of the data processing transactions are each distributed or transformed into a plurality of data processing transactions which are then allocated as described above. The invention operates effectively in workload balancing systems in which there is a server queue for storing the plurality of messages from the distributed transaction, and in which each of the different computer systems has an associated queue for storing messages allocated to each respective computer system. If one of the different computer systems has means for reallocating to other computer systems, messages initially allocated to said one computer system, then the invention provides for user interactive means for displaying the reallocated messages and computer systems to which the messages are reallocated.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
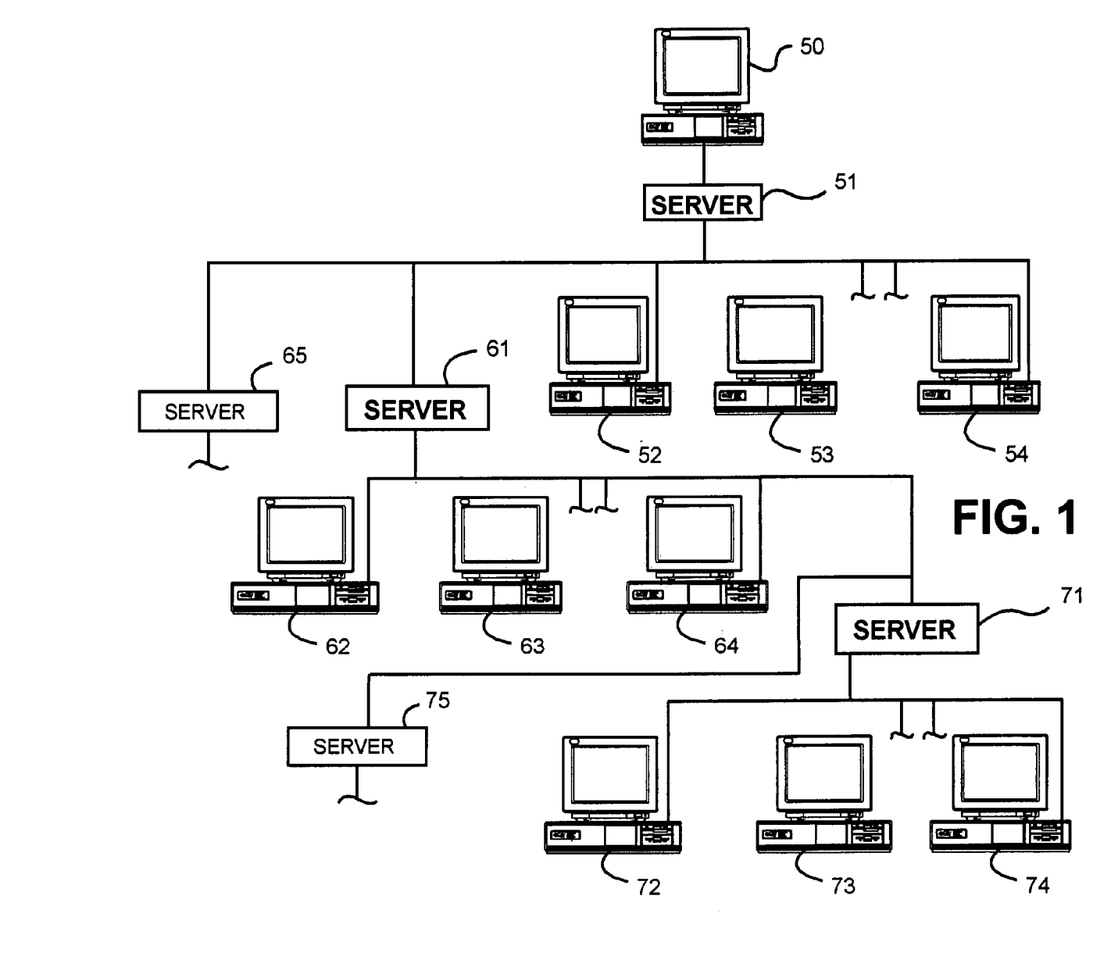
FIG. 1 is a generalized network setup on which the workload balancing through message allocation including the message tracking process of the present invention may be carried out.

FIG. 1 is a generalized network setup on which the workload balancing through message allocation including the message tracking process of the present invention may be carried out. By way of background, the present invention involves the tracking of messages in message driven transaction environments wherein the user at a client terminal inputs a data processing transaction which he needs to have performed, and the transaction is dynamically transformed or distributed into messages which in turn are communicated for performance to appropriate programs on appropriate computers in a network. All this is done transparently and, thus, is invisible to the user who requested the transaction performance. In present message based transaction performance systems such as the aforementioned IBM MQSeries, message allocation for performance or execution may be seamlessly communicated across computer systems with dozens of different supported platforms. A primary premise of message-based transactions in workload allocation is that the programs involved exchange requests and responses via queues. A program sends a request to a queue rather than a specific "partnered" program. Thus, a program can put a message into a queue even if there is no program currently available to retrieve the message from the queue and process it. Queue managers manage the queues and the messages contained or manipulated in the queues. This guarantees the ultimate delivery to and execution of the messages in appropriate target queues. The primary services that message driven transaction environments require are provided by the message queue manager. Such services include administrative services to manage the queues and to manipulate the messages in the queues. In turn, the application programs which will execute the messages and reside in local or remote computer systems in the network manipulate the messages through a messaging client that provides an interface to all necessary operations even in cross-platform computer systems. This message driven transaction environment is described in detail in the above referenced [Production Workflow, Concepts and Techniques, Frank Leymann et al., particularly at pages 319–330. Background on workload balancing in a message driven transaction environment may also be found in this text and in the above-mentioned U.S. Pat. No. 5,799,173. It should be understood in proceeding with the following description of the present invention that the particular algorithm used in workload balancing in distributing, parsing and allocating the data transactions into messages is in no way critical to the invention. Any workload balancing algorithm may be used. The present invention is directed to the tracking of the allocated messages.

In the illustrative network of FIG. 1, a client user on computer display terminal 50 has input a transaction for performance. Terminal 50 is connected to server 51 which includes the workload balancing program and administrator which will distribute the transactions into messages and allocate the messages to particular programs in computers in the system for execution. Server 51 also includes the message queue and the message queue manager. The messages may be dynamically distributed to display computer terminals 52, 53 or 54 for performance or execution, or to other computer systems controlled by servers 65 or 61 at a next hierarchical level, e.g. the system including server 61 and display computers 62, 63 and 64. Servers 65 and 61 will respectively include their own message queues and the message queue managers. The messages may be dynamically distributed to display computer terminals 62, 63 or 64 for performance or execution, or to other computer systems controlled by servers 75 or 71 at an even further hierarchical level, e.g. the system including server 71 and display computers 72, 73 and 74. Here again, servers 75 and 71 will in turn respectively include their own message queue and the message queue manager. In sufficiently complex distribution systems, the messages may even be allocated and communicated for execution through the World Wide Web (Web) or Internet. Since this whole allocation of messages has been dynamic and transparent to the user, the need for the message tracking system of this invention may be understood.

Figure 2:
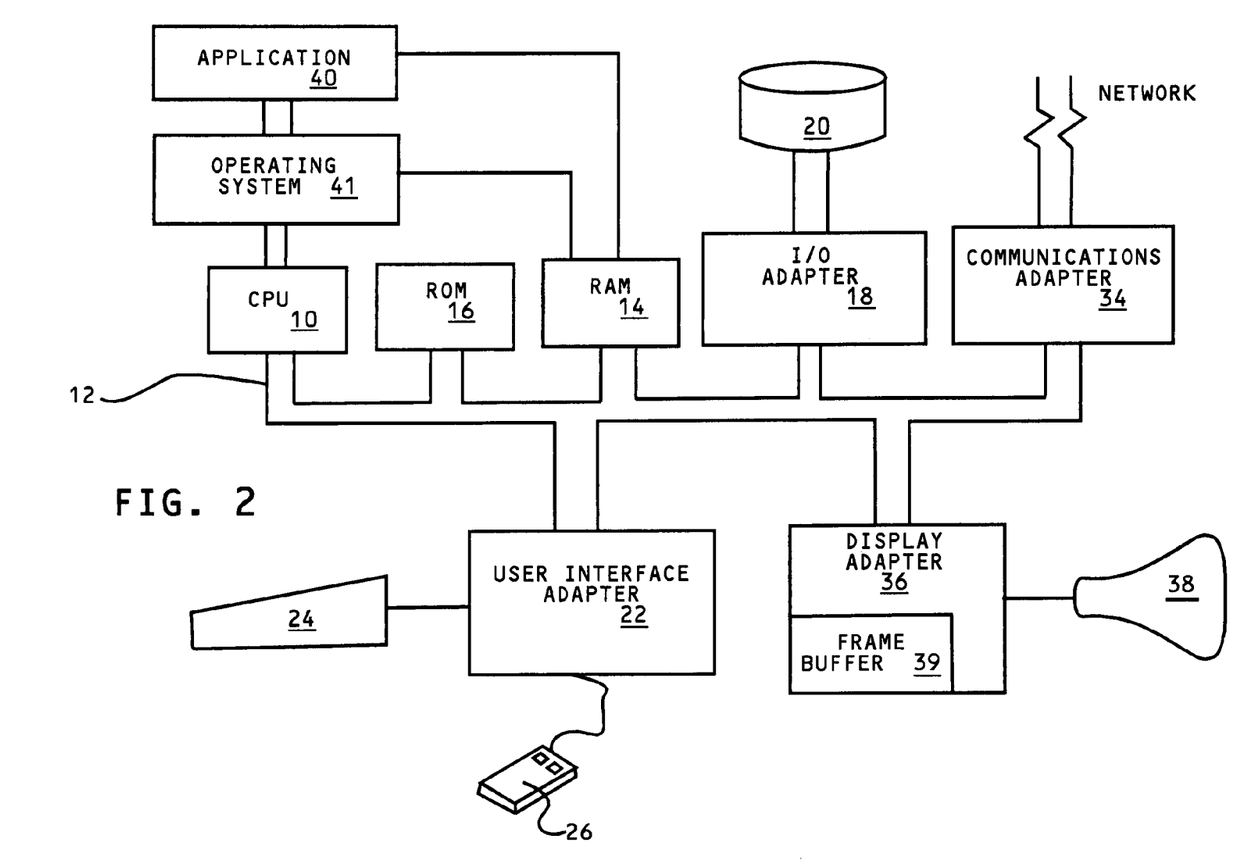
FIG. 2 is a block diagram of a data processing system including a central processing unit and network connections via a communications adapter which is capable of functioning as the display computers and servers of FIG. 1 in carrying out the present invention.

Referring to FIG. 2, a typical computer controlled display system is shown which may function as the computer display terminals 53–54, 62–64 and 72–74 (FIG. 1). The display system of FIG. 3 may also be used for the workload balancing and queue management servers 51, 61, 65, 71 and 75. A central processing unit (CPU) 10, may be one of the commercial PC microprocessors; when the system shown is used as the server computer, then a workstation may be used, e.g. RISC System/6000™ (RS/6000)™ series available from IBM. The CPU is interconnected to various other components by system bus 12. An operating system 41 runs on CPU 10, provides control and is used to coordinate the function of the various components of FIG. 3. Operating system 41 may be one of the commercially available operating systems such as the AIX 6000™ operating system available from IBM; Microsoft's Windows 98™ or Windows NT™, as well as UNIX™ and AIX™ operating systems. Application programs 40, in the computers performing the allocated message functions, are moved into and out of the main memory Random Access Memory (RAM) 14. In the servers, these programs would include the appropriate workload balancing algorithms, the queue management programs, as well as the programs of the present invention for tracking the dynamically allocated messages. A Read Only Memory (ROM) 16 is connected to CPU 10 via bus 12 and includes the Basic Input/Output System (BIOS) that controls the basic computer functions. RAM 14, I/O adapter 18 and communications adapter 34 are also interconnected to system bus 12. I/O adapter 18 may be a Small Computer System Interface (SCSI) adapter that communicates with the disk storage device 20. Communications adapter 34 interconnects bus 12 into the network environment of FIG. 1 to communicate with other such computers over a Local Area Network (LAN) or through the Web or Internet. The latter two terms are meant to be generally interchangeable and are so used in the present description. I/O devices are also connected to system bus 12 via user interface adapter 22 and display adapter 36. Keyboard 24 and mouse 26 are all interconnected to bus 12 through user interface adapter 22. Display adapter 36 includes a frame buffer 39, which is a storage device that holds a representation of each pixel on the display screen 38. Images may be stored in frame buffer 39 for display on monitor 38 through various components, such as a digital to analog converter (not shown) and the like. By using the aforementioned I/O devices, a user is capable of inputting information to the system through the keyboard 24 or mouse 26 and receiving output information from the system via display 38.

Figure 3:
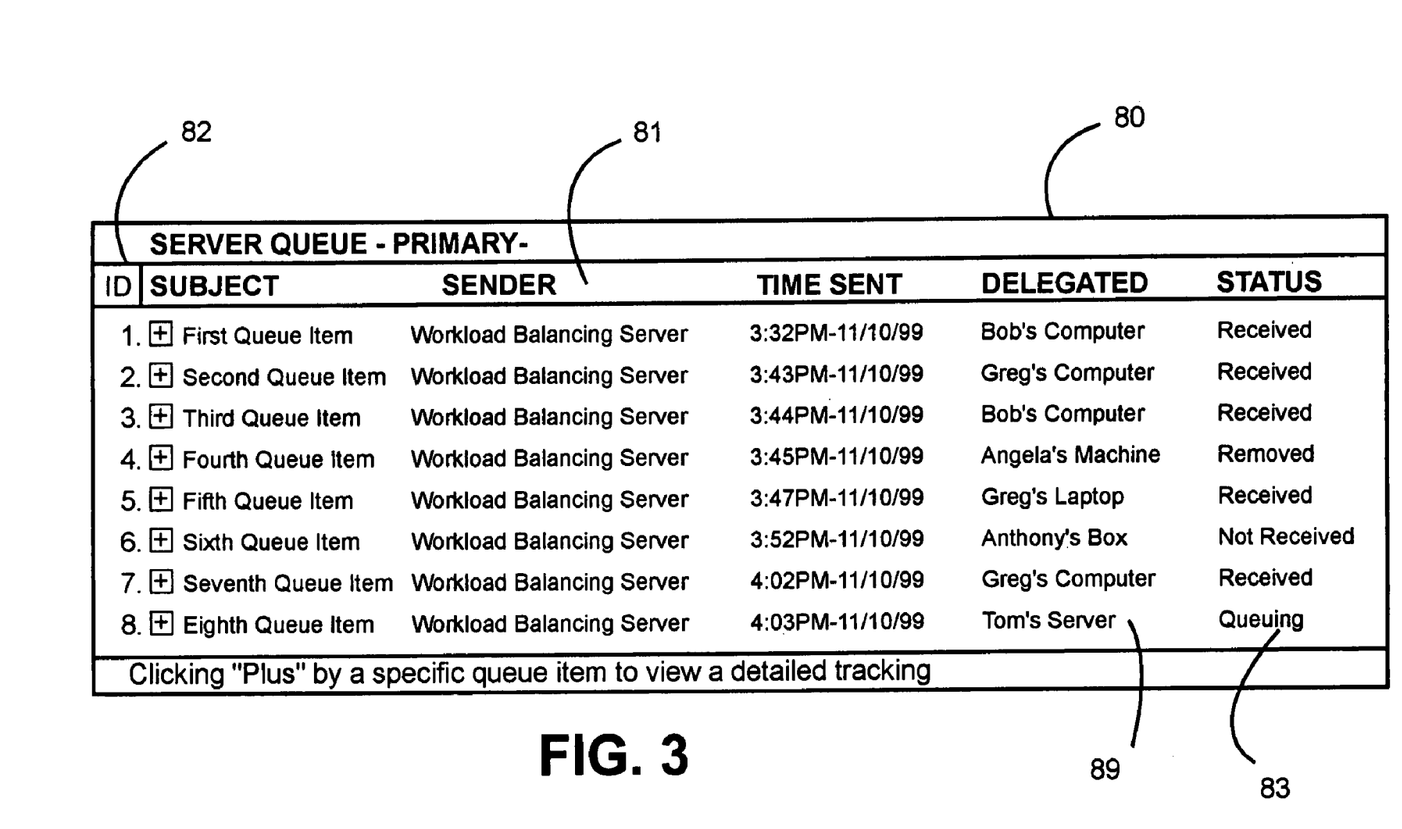
FIG. 3 is a diagram of an interactive display screen listing the message allocations of a queue manager's queue on a primary server presented to the user tracking messages in carrying out the present invention.
Figure 4:
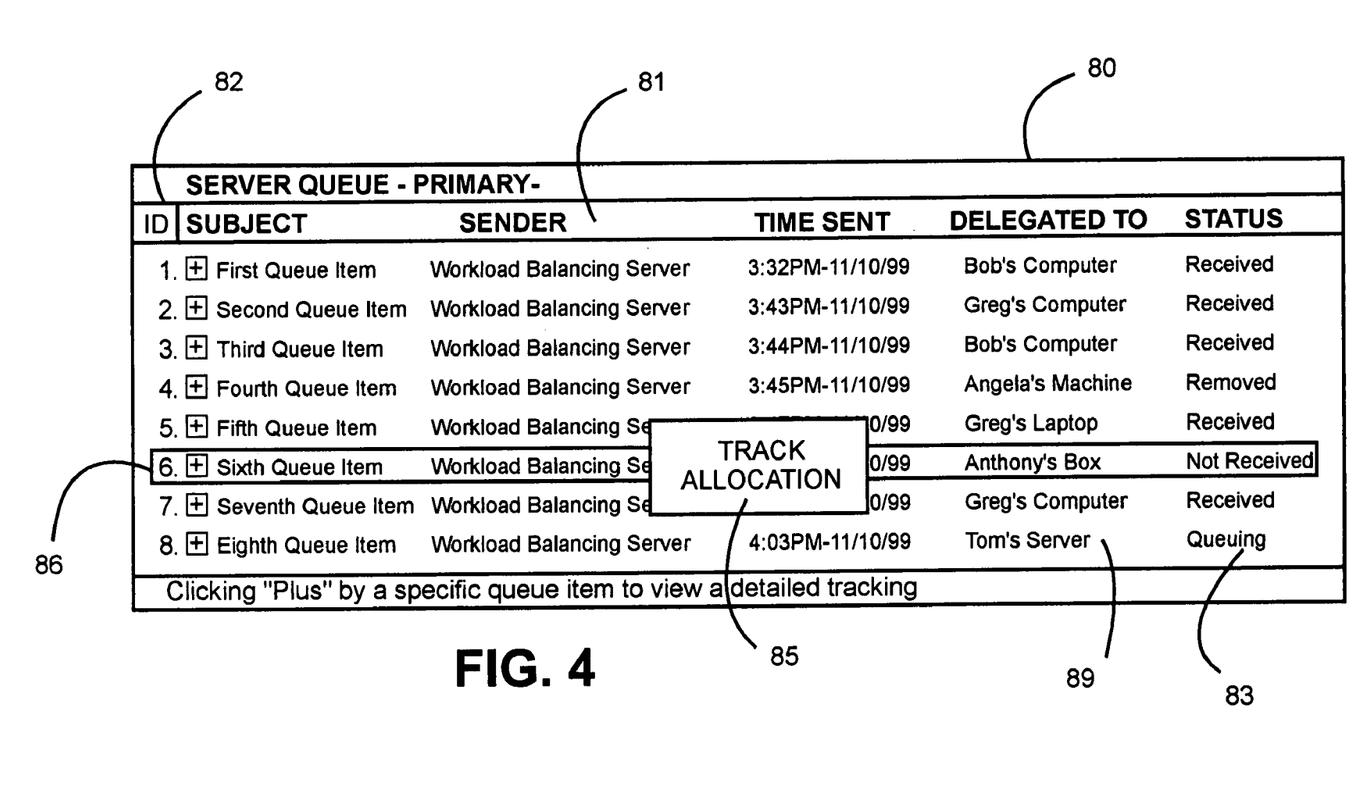
FIG. 4 is the display screen of FIG. 3 as the user is selecting a message for allocation tracking.
Figure 5:
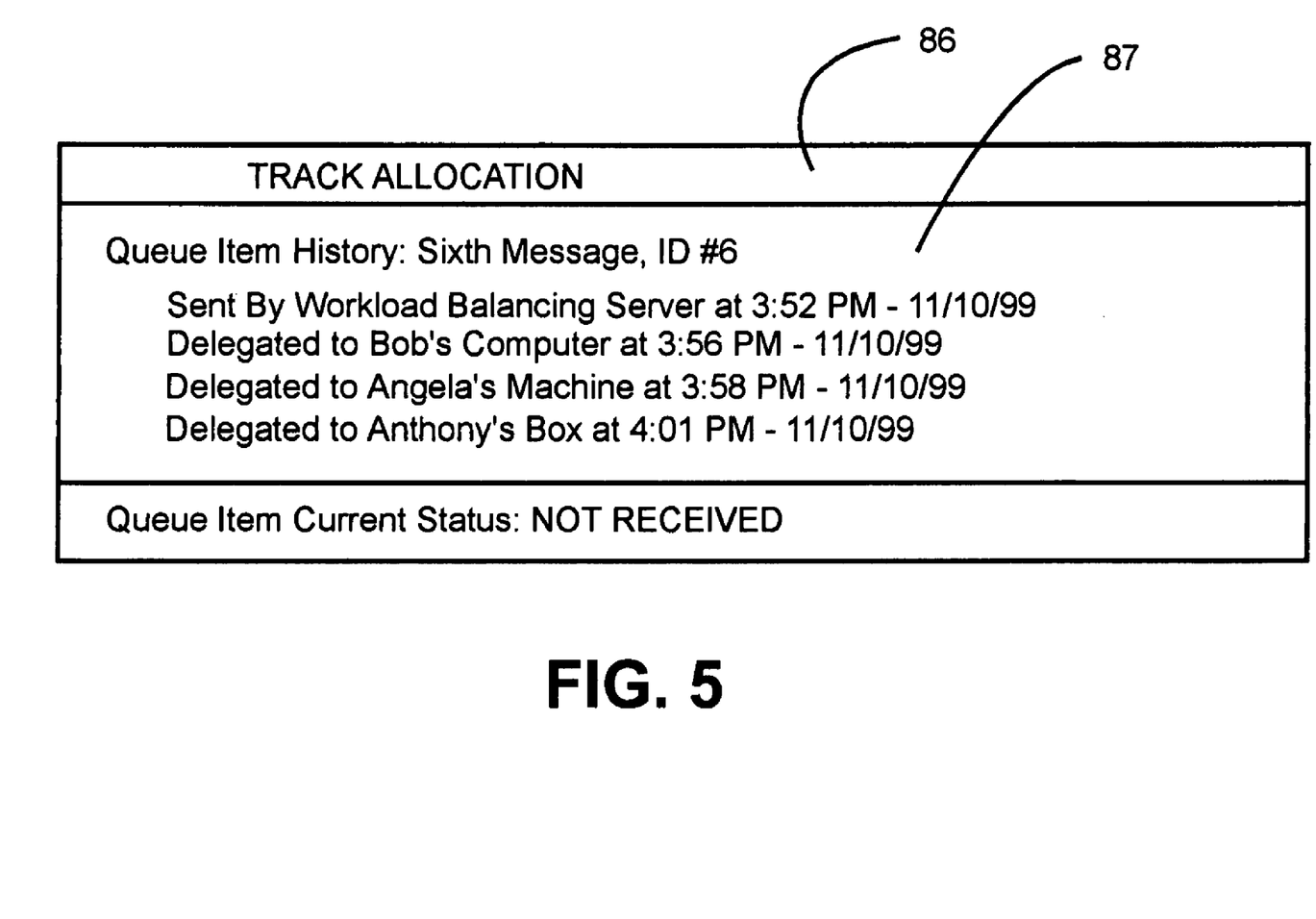
FIG. 5 is a display screen showing the tracking history of the route of an item which the user selected from the display screen of FIG. 4.

Now with reference to FIGS. 3 through 5, we will describe a simple illustration of how a user who has requested a data transaction on an initial input display terminal (e.g. terminal 50, FIG. 1) may track the allocation and status of the messages for carrying out the transaction or transactions. The user on computer display terminal 50 may bring up and display the message queue listing 80, FIG. 3, of the message queue in server 51. The displayed listing shows the message ID 82, the sender 81, the status 83 of each listed message and the present stage of dynamic allocation of the message 89. As shown in FIG. 4, if the user is uncertain as to the allocation status 89 of a listed message which is the situation with the sixth queue item, he may select and, thus, highlight the item 86 and be provided with an interactive button 85 which he may then push to bring up the display of FIG. 5. This shows the allocation history 86 of the sixth queue item as it was dynamically allocated and reallocated via listed route 87 through a network such as that shown in FIG. 1. The route 87 indicates that the sixth message was received at "Angela's Machine" from which it was allocated to "Anthony's Box" where it has not been received as yet. Thus, the message is currently being worked on as Anthony's Box.

It should be noted that the accessibility of the managed messages queue as in FIG. 3 enables the interactive user to delete or modify messages listed in the queue.

Figure 6:
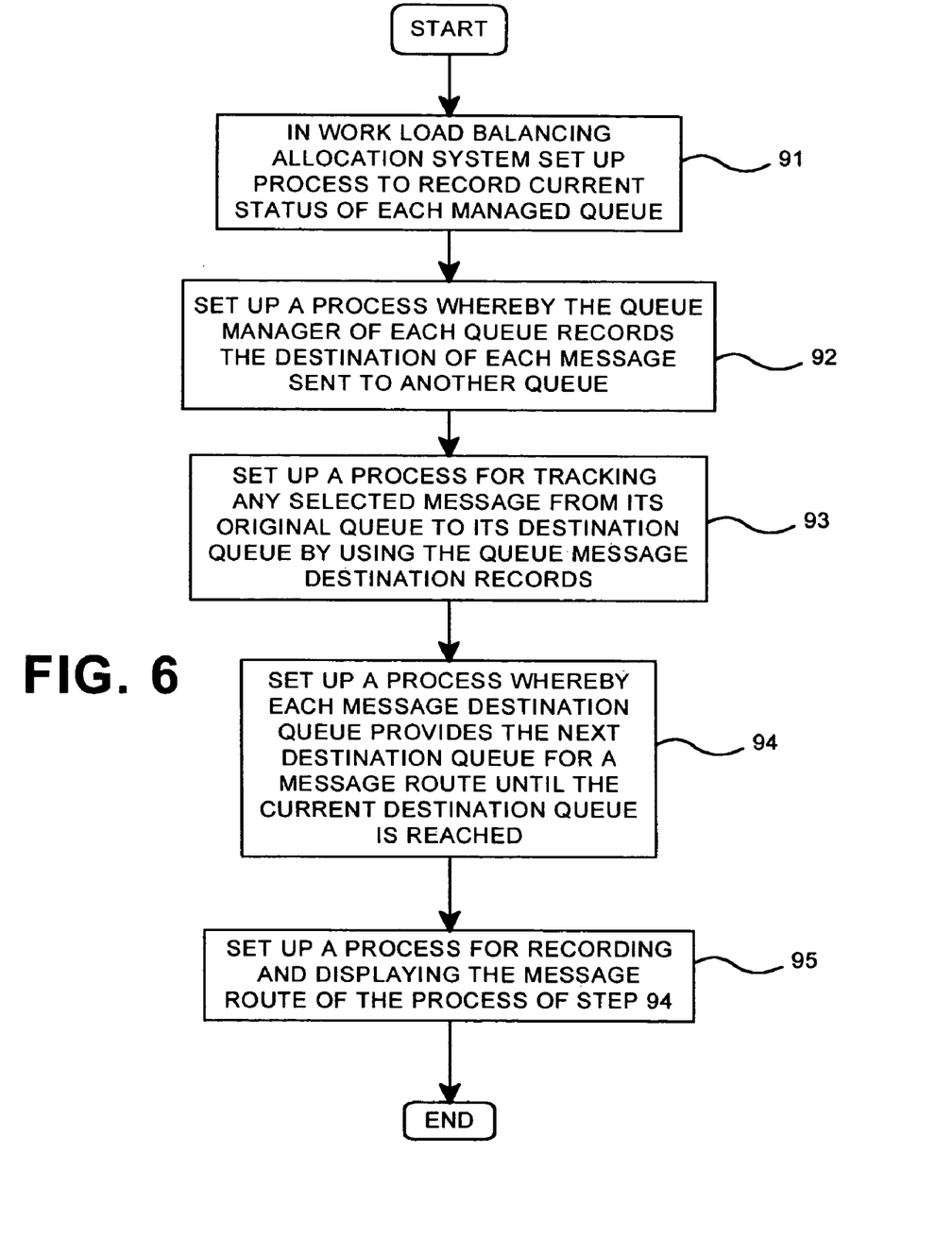
FIG. 6 is a flowchart of an example of a typical programming process which has to be set up in a workload balancing system to implement the tracking of the present invention.

With reference to FIG. 6, there will now be described an illustration of how the processes of the present invention may be set up. In any workload balancing system, such the types described above, means are set up in association with each managed queue in its respective server for recording the destination of each message sent to another queue, step 91. A process is set up so that the queue manager of each managed queue records the destination of each message sent to another queue, step 92. A process is set up, step 93, for tracking any selected message from its original queue to its destination queue by using the queue message destination records from step 92. A process is set up, step 94, whereby each message destination queue provides the next destination for determining the route of a message until the most current destination queue is reached. A process is provided, step 95, for recording and displaying the message route determined by the process of step 94.

Figure 7:
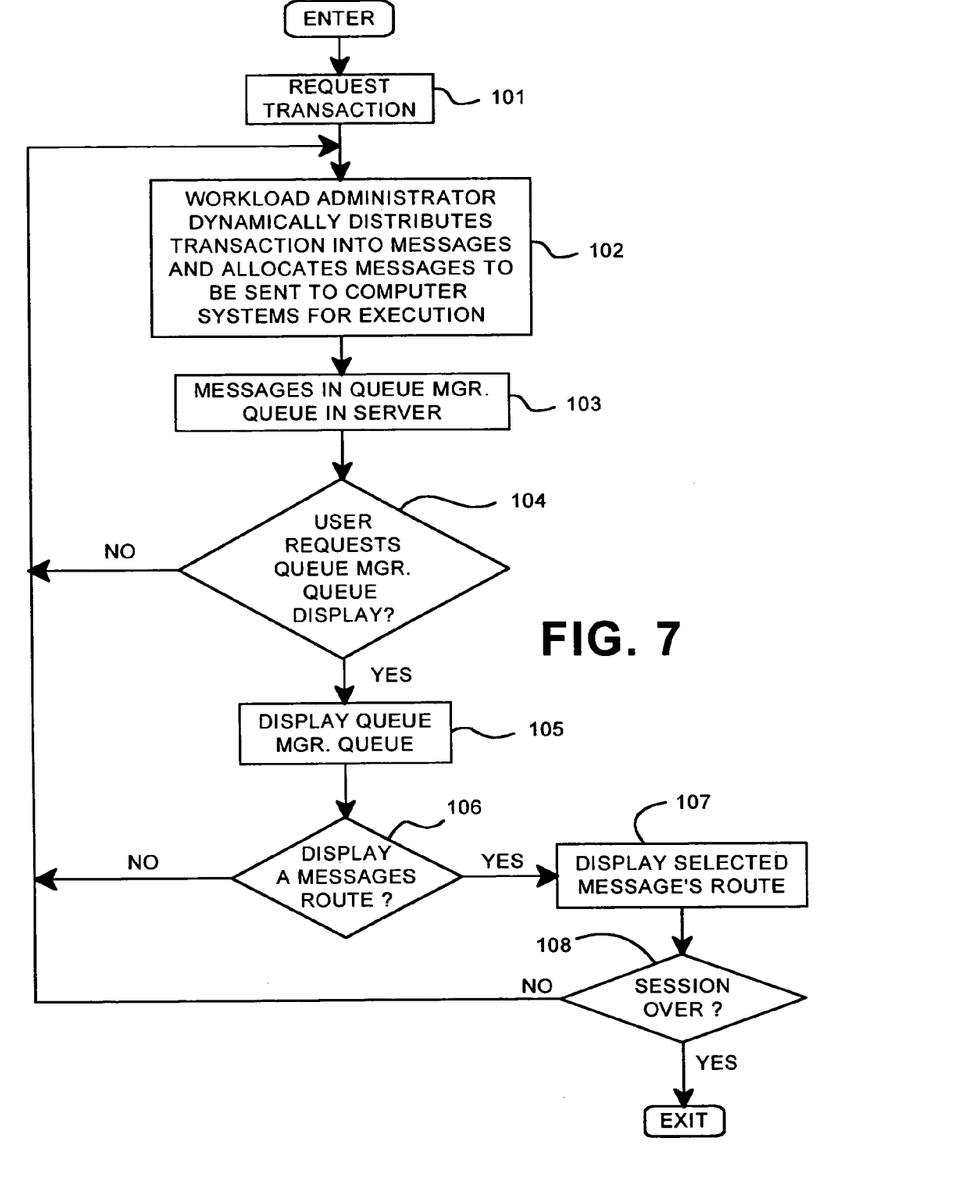
FIG. 7 is a flowchart of an illustrative run of a process set up according to FIG. 6 for message tracking.

Now, with reference to FIG. 7, we will describe how a transaction may be processed and potentially tracked using the processes set up in FIG. 6. The user requests an initial transaction, step 101, on an input terminal, e.g. display terminal 50, FIG. 1. The workload balancing program administrator in the server dynamically distributes and/or parses the input transaction into messages and allocates messages to be sent to particular computers and computer systems for execution, step 102. The messages are put into the queue manager's queue in the server, e.g. server 51, FIG. 1. At any point in this procedure the user may request, decision step 104, a display of the queue manager's message queue. If No, the user does not make such a request, the process returns to step 102 and the allocation continues. However, if the decision from step 104 is Yes, the user has requested the display of the queue, then the queue, as shown in FIG. 3, is displayed, step 105. At this point, the user may note something in the displayed queue which may lead him to decide that he needs to view the allocation route of the message. If No, decision step 106, the process is returned to step 102, and the allocation process is continued. If the decision from step 106 is Yes, then step 107, the selected messages route is displayed, step 107, FIG. 5. At this point, a determination may be made as to whether the session is over, decision step 108. If Yes, the session is exited. If No, then the session is again returned to step 102 and the message allocation process continued.

Figure 8:
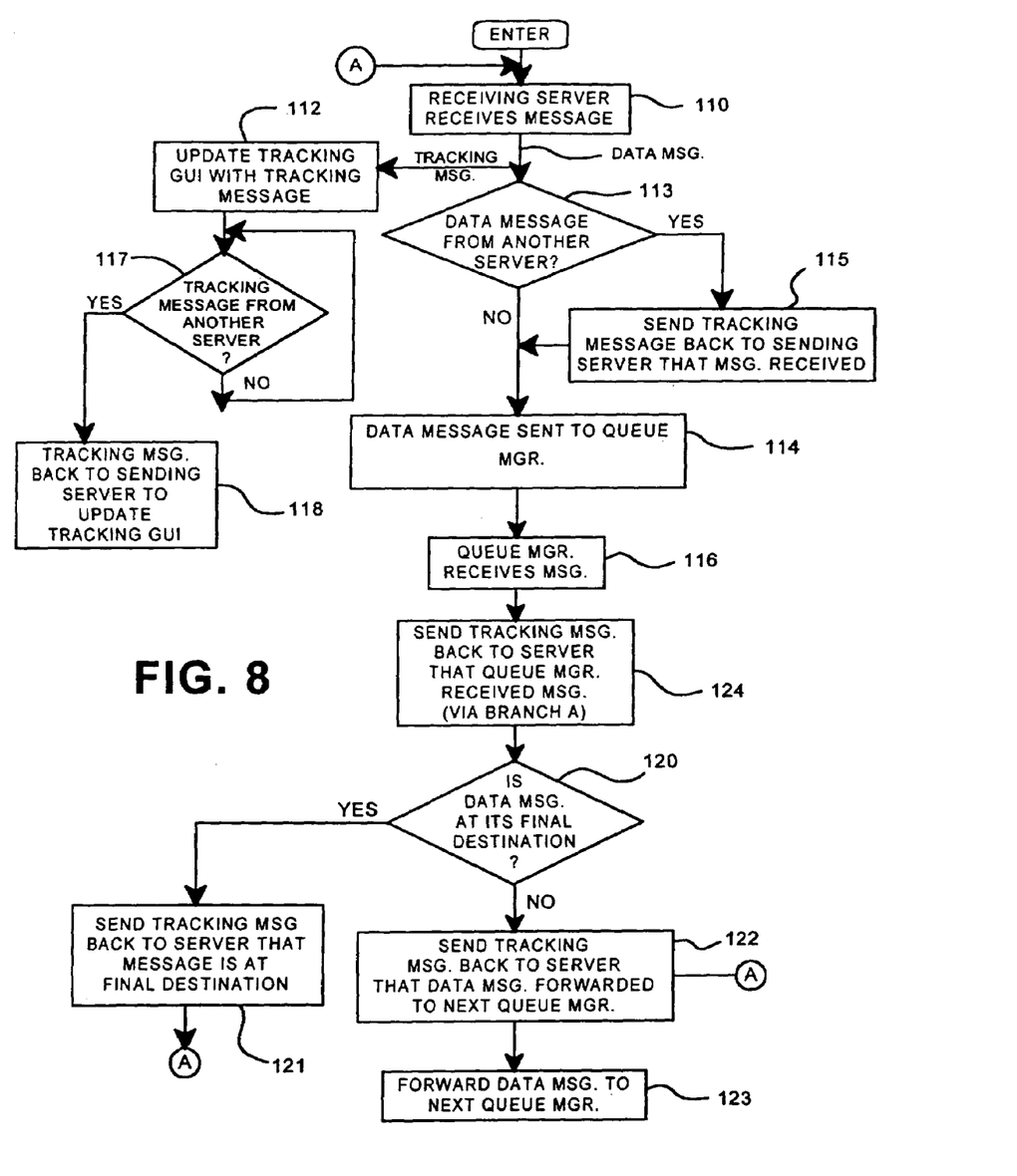
FIG. 8 is a flowchart setting forth an example of how the route of a tracked allocated message may be recorded so that it's status is available to previous servers in its allocation route.

FIG. 8 is a flowchart setting forth an example of how the route of a tracked allocated message may be recorded (step 95 of FIG. 6) so that its status is available to previous servers in its allocation route and that route may be displayed (step 107 of FIG. 7). For purposes of describing FIG. 8, the allocation tracking display of FIG. 5 is referred to as the tracking Graphic User Interface (GUI). For tracking purposes in this example, when a workload transaction is distributed into a plurality of messages for doing the actual work, which we will refer to as "data messages", there will also be set up a plurality of "tracking messages" which will function to track the status of the data messages for the purpose of updating the tracking GUIs respectively associated with the sequence of servers in the allocation route of the data messages. Let us assume, for example, that a sending server is sending a transaction as a sequence of messages to a receiving server, which upon receiving the next message in the transaction message sequence that it is processing, step 110, determines whether it is a data message or a tracking message. If it is a data message, then a determination is made, step 113, as to whether the data message was sent from another server. If Yes, step 115, a tracking message is sent back to the sending server stating that the data message was received. In such a case, the tracking message will be received by the sending server of the data message which now becomes the receiving server for this tracking message, and the flow will proceed through step 110 to step 112 where the tracking GUI associated with the sending server of the data message will be updated to reflect the tracking message. Also, a determination will then be made in step 117 that the tracking message came from another server, and then, step 118, another tracking message will be set back to the sending server of the first tracking message.

In any event, getting back now to decision step 113, if is determined that a data message is not from another server, the data message is sent to the queue manager, step 114, i.e. the data message may be sent to the queue manager that contains the destination queue or to the queue manager that will forward the message to the destination queue. In the case where the decision from step 113 is Yes, then the process also goes to step 114 but only after step 115 is carried out as described above by sending a tracking message back to the sending server. When this queue manager receives this data message, step 116, the server is advised through a tracking message, step 124, that the next queue manager has received the message. Then a determination is made, step 120, as to whether the data message is at its final destination. If Yes, then step 121, a tracking message is sent back to the receiving server via branch "A" to step 110 that the queue manager has received the message. If the decision is No, the data message is not at its final destination, then step 122, a tracking message is sent back to the server via branch "A" to step 110 that the data message is forwarded to another queue manager, and the data message is forwarded to the next queue manager, step 123.

A convenient implementation of the present invention is in an application program 40 made up of programming steps or instructions resident in RAM 14, FIG. 2, of the server computers during various operations. Until required by the computer system, the program instructions may be stored in another readable medium (e.g. in disk drive 20, or in a removable memory such as an optical disk for use in a CD ROM computer input, or in a floppy disk for use in a floppy disk drive computer input). Further, the program instructions may be stored in the memory of another computer prior to use in the system of the present invention and transmitted over a LAN or a Wide Area Network (WAN), such as the Internet, when required by the user of the present invention. One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

The invention claimed is:

1. A workload balancing system for distributing data processing transactions into a plurality of messages and for dynamically allocating each of said plurality of messages to different computer systems for performance comprising:
   - means for requesting the performance of a data processing transaction;
   - a server computer for said distributing said transaction into messages and dynamically allocating said messages to said different computer systems; and
   - a server queue associated with said server computer for storing said messages from the distributed transaction; and
   - user interactive display means for interactively displaying said server queue of the allocated messages and associated said different computer systems.

2. The workload balancing system of claim 1 wherein each of said different computer systems has an associated queue for storing messages allocated to each respective computer system.

3. The workload balancing system of claim 2 wherein at least one of said different computer systems has means for reallocating to other computer systems, messages initially allocated to said one computer system.

4. The workload balancing system of claim 3 further including user interactive means for displaying said reallocated messages and computer systems to which said messages are reallocated.

5. The workload balancing system of claim 1 further comprising an interactive display computer including said means for requesting the performance of a data processing transaction and user interactive display means for displaying said allocated messages and associated computer systems.

6. A method for distributing data processing transactions into a plurality of messages and for dynamically allocating each of said plurality of messages to different computer systems for performance comprising:
   - requesting the performance of a data processing transaction;
   - distributing said transaction into messages and dynamically allocating said messages to said different computer systems by a server computer; and
   - storing said messages from the distributed transaction in a server queue associated with said server computer; and
   - interactively displaying said server queue of the allocated messages and said different computer systems.

7. The method of claim 6 including the step of storing messages allocated to each respective computer system in a queue associated with said computer system.

8. The method of claim 7 further including the step of reallocating to other computer systems, messages initially allocated to one of said different computer systems.

9. The method of claim 8 further including the step of user interactively displaying said reallocated messages and computer systems to which said messages are reallocated.

10. A computer storage medium having a computer program program code for workload balancing of distributed data processing transactions into a plurality of messages and to dynamically allocate each of said plurality of messages to different computer systems for performance, comprising:
    - means for requesting the performance of a data processing transaction;
    - means for said distributing said transaction into messages and dynamically allocating said messages to said different computer systems;
    - server queue means for storing said messages from the distributed transaction; and
    - server queue means for storing said messages from the distributed transaction; and
    - user interactive display means for interactively displaying said server queue of the allocated messages and associated said different computer systems.

11. The computer storage medium of claim 10 wherein each of said different computer systems has an associated queue for storing messages allocated to each respective computer system.

12. The computer storage medium of claim 11 further including means for reallocating to other computer systems, messages initially allocated to said one computer system.

13. The computer storage medium of claim 12 further including user interactive means for displaying said reallocated messages and computer systems to which said messages are reallocated.

14. The computer storage medium of claim 10 wherein said means for requesting the performance of a data processing transaction and said user interactive display means for displaying said allocated messages and computer systems are in a user interactive display computer.

* * * * *